Patented Feb. 13, 1923.

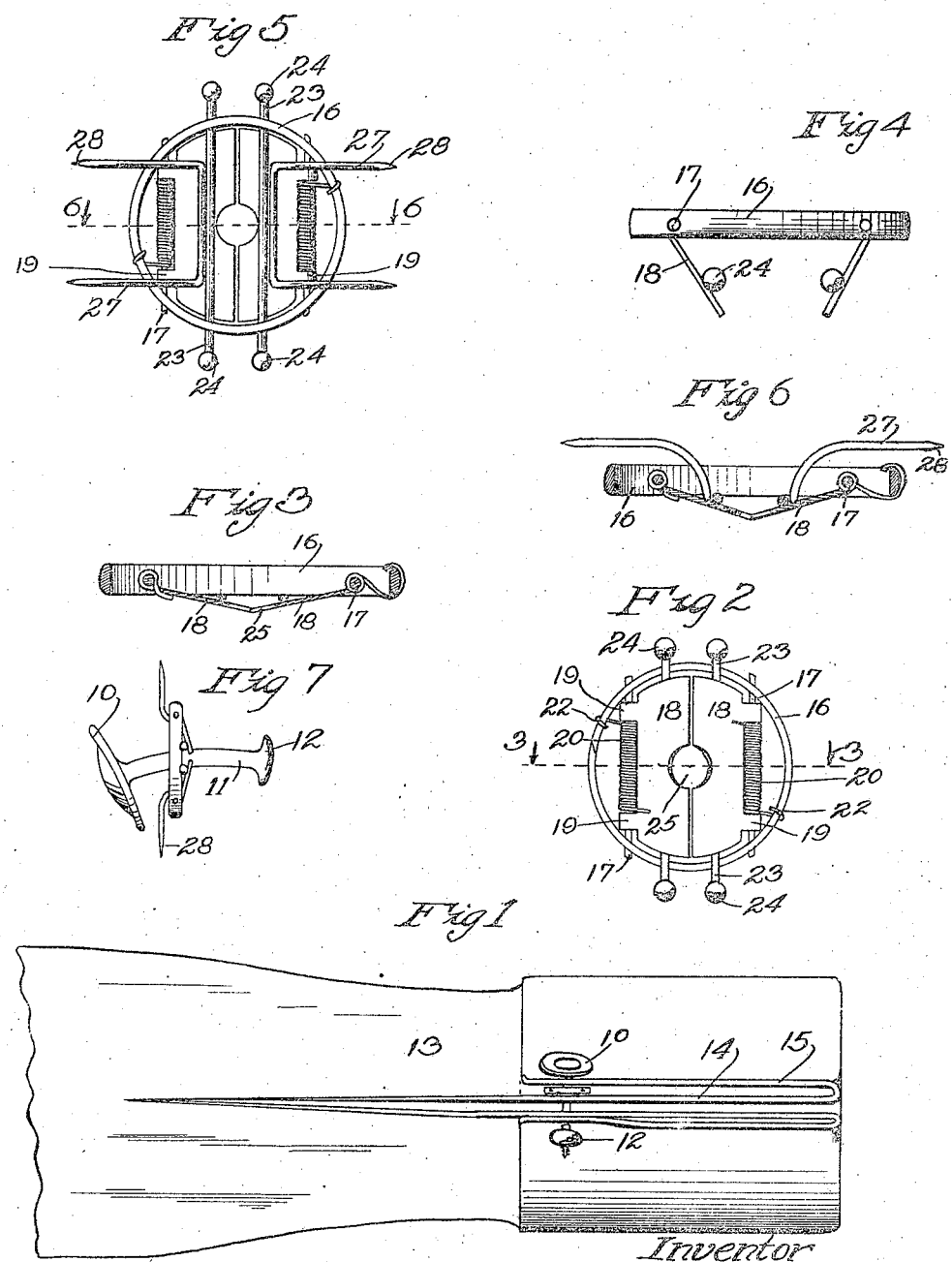

1,445,062

UNITED STATES PATENT OFFICE.

LEW ARNTZ, OF DES MOINES, IOWA.

DEVICE FOR PREVENTING THE LOSS OF CUFF BUTTONS.

Application filed April 17, 1922. Serial No. 554,226.

*To all whom it may concern:*

Be it known that I, LEW ARNTZ, a citizen of the United States, and a resident of Des Moines, in the county of Polk and State of Iowa, have invented a certain new and useful Device for Preventing the Loss of Cuff Buttons, of which the following is a specification.

The object of my invention is to provide a device of simple and inexpensive and durable construction, which can be used for preventing the loss of cuff buttons or cuff links from the sleeve or cuff.

More particularly, it is my object to provide a device, which can be slipped onto the shank of a cuff link or cuff button, and which when in position will prevent the cuff button from being lost by accident from the cuff or sleeve.

With these and other objects in view, my invention consists in the construction, arrangement and combination of the various parts of my device, whereby the objects contemplated are obtained, as hereinafter more fully set forth, pointed out in my claims, and illustrated in the accompanying drawings, in which:

Figure 1 shows an elevation of a cuff and cuff link, having one of my improved devices thereon.

Figure 2 shows a plan view of my device.

Figure 3 shows a sectional view through the device inverted, taken on the line 3—3 of Figure 2.

Figure 4 shows a side elevation of the device with the movable members open.

Figure 5 shows an inverted, plan view of a slightly modified form of my device.

Figure 6 shows a detail, sectional view taken on the line 6—6 of Figure 5; and

Figure 7 shows a side elevation of my improved device of the forms shown in Figures 5 and 6.

In the accompanying drawings, I have used the reference numeral 10 to indicate generally the ornamental head of a cuff link, having the shank 11, and having at its other end, a smaller head 12.

In Figure 1, I have shown a sleeve 13, having at its end the folded over cuff, having inner and outer portions 14 and 15.

It is well-known that the head 12 is often so small that it slips through the button-holes of the cuff, so that the cuff link is accidentally lost.

My improved device for preventing such loss consists of a ring 16. Hinged to the ring preferably by means of wire pintles or the like 17 arranged parallel with and spaced from each other are two gate members 18, clearly shown in Figure 2.

The gates 18 are preferably provided at their outer edges with spaced journals 19, which are mounted to rotate on the wire members 17.

Between each pair of journals 19 of each gate, there is mounted on the wire 17 a coil spring 20, having one end projecting over the gates 18 and 21 and the other end fixed to the ring 16, as at 22, the coil spring being thus adapted to hold the gate members closed.

Each gate member has a pair of arms or the like 23 projecting past the ring 16 and having heads 24, as shown in Figure 2.

The arms 23 limit the closing movement of the gate members to hold them in closed position by engaging the ring 16. The heads 24 may be used for pushing the gate members open toward their position shown for instance in Figure 4.

When the device is ready for use, the head 12 is inserted through the outer fold 15 of the cuff and the gate members are then opened toward their position shown in Figure 5, and pushed over the head 12 of the cuff link, and are then permitted to close.

The gate members have at their central portions, recesses or notches 25 arranged to register with each other and to receive the shank 11 of the cuff link.

After the device has thus been mounted on the shank, the head 12 is then inserted through the inner hole of one half of the cuff and then through the inner and outer holes of the other end of the cuff, as shown for instance in Figure 1.

When the device is thus assembled on the link and the cuff is inserted in the proper button-holes, my device will be entirely invisible.

In Figures 5, 6 and 7, I have shown a slightly modified form of my invention.

The parts heretofore described are the same as has already been explained.

There is mounted, however, on each gate member a U-shaped device 27, having pointed ends 28, arranged to point away from the device, as shown in Figure 5.

In mounting the device of the kind shown in Figures 5, 6 and 7 on the cuff, the pointed arms 28 are inserted through the cloth of the cuff, and the members 28 serve as pin points or the like and hold the device exactly where it is placed, and particularly will hold it to the cloth of the cuff.

The device can be made in either of the forms here shown, and in either case will prevent the loss of the cuff link.

Some changes may be made in the construction and arrangement of my improved device without departing from the essential features and purposes of my invention, and it is my intention to cover by my claims, any modified forms of structure or use of mechanical equivalents, which may be reasonably included within their scope.

I claim as my invention:

1. A device of the class described adapted to be used with a cuff link, comprising a supporting member, a pair of hinged gates mounted thereon, means for normally holding said gates closed with their corresponding edges adjacent to each other, said gates being provided in said edges with registering notches to receive the shank of a cuff link and means projecting in opposite directions mounted on said gates adapted to coact with the cuff material for preventing the loss of the cuff link as specified.

2. A device of the class described, comprising a ring, a pair of gates hinged thereon, means for normally, yieldingly, holding said gates in closed position forming substantially a closure member for the ring, said gates having in their adjacent edges registering notches, handle devices on said gates projecting beyond said ring and forming stops as well as handles.

3. A device of the class described, comprising a ring, a pair of gates hinged thereon, means for normally, yieldingly holding said gates in closed position forming substantially a closure member for the ring, said gates having in their adjacent edges registering notches, handle devices on said gates projecting beyond said ring and forming stops as well as handles, and pointed members projecting in opposite directions from said gates, when said gates are closed.

Des Moines, Iowa, April 3, 1922.

LEW ARNTZ.